March 28, 1933. H. G. LANDIS 1,903,219
ELECTRIC HEATER
Original Filed Aug. 17, 1928 5 Sheets-Sheet 1
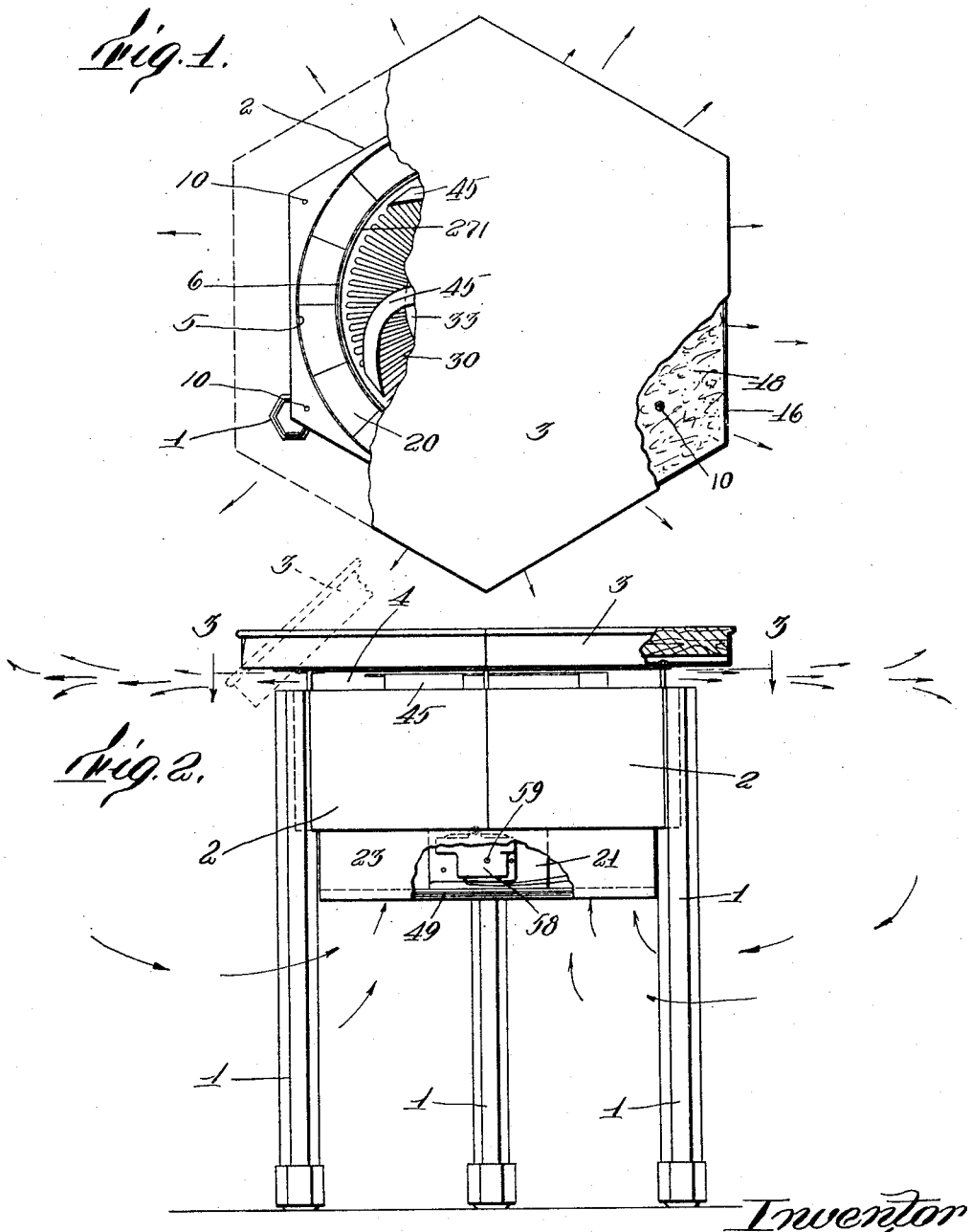

March 28, 1933.  H. G. LANDIS  1,903,219
ELECTRIC HEATER
Original Filed Aug. 17, 1928  5 Sheets-Sheet 2
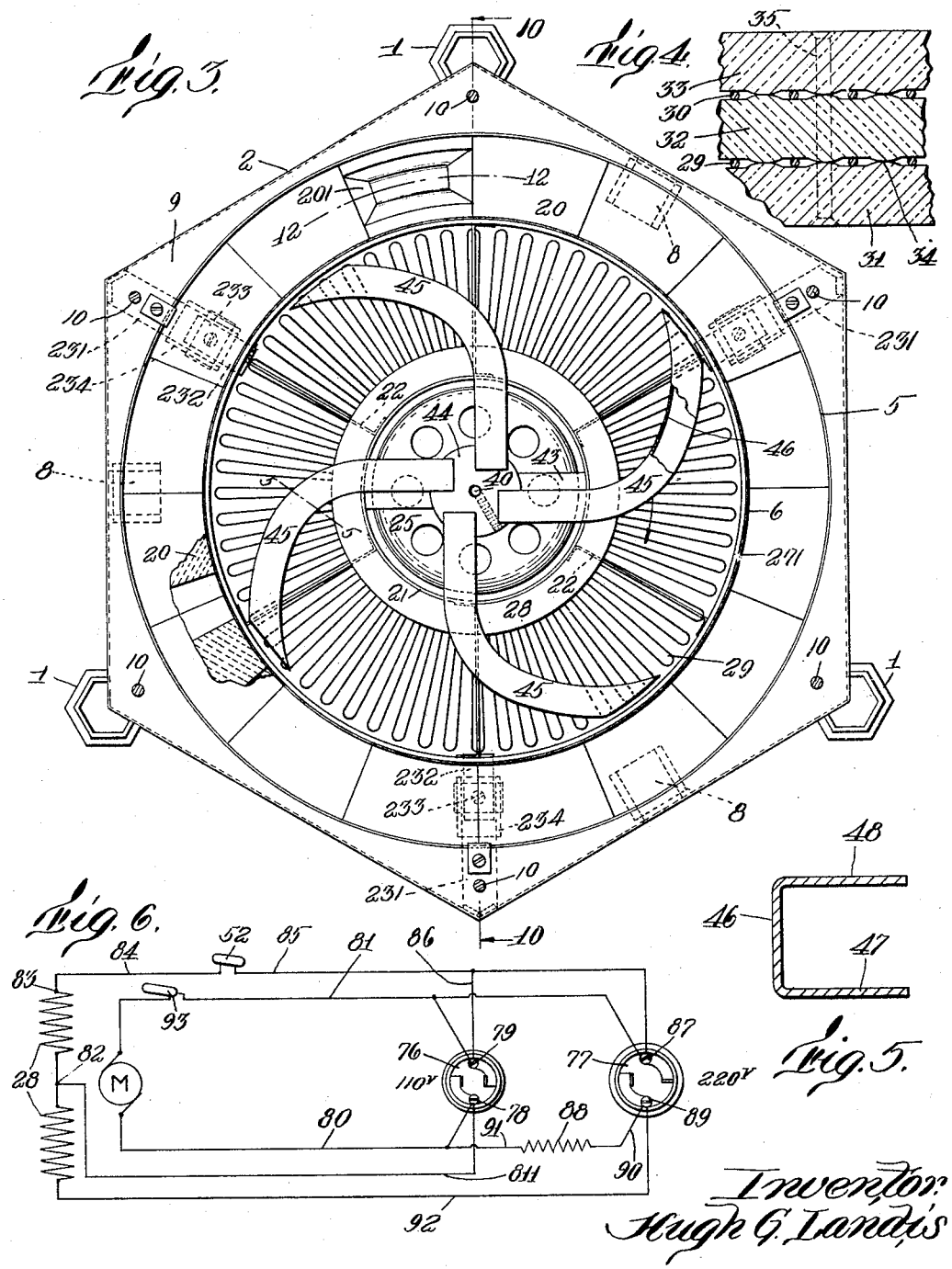
Inventor
Hugh G. Landis

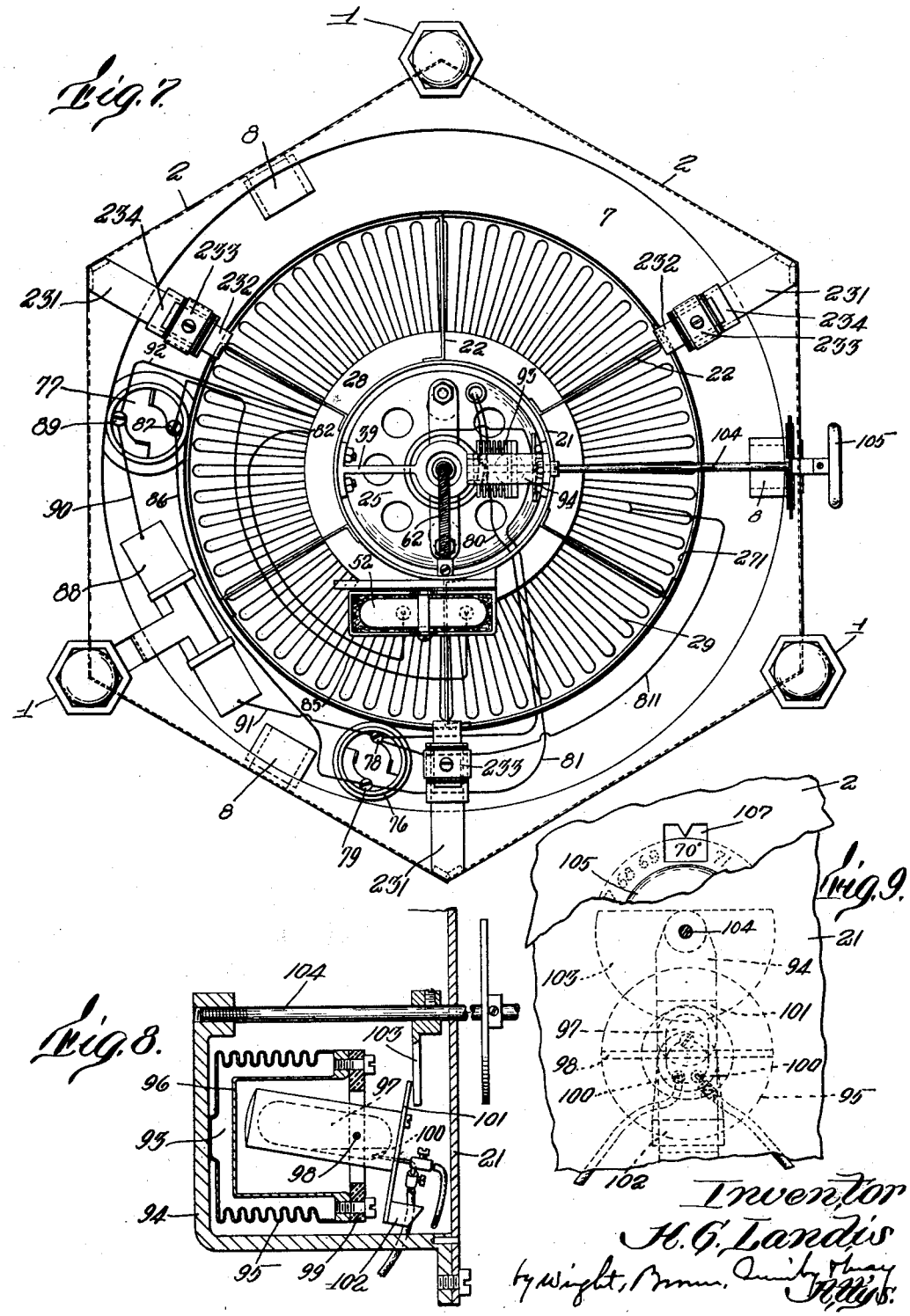

March 28, 1933.  H. G. LANDIS  1,903,219

ELECTRIC HEATER

Original Filed Aug. 17, 1928   5 Sheets-Sheet 4

Inventor
Hugh G. Landis
by Wright, Brown, Quinby & May
Attys.

March 28, 1933.  H. G. LANDIS  1,903,219
ELECTRIC HEATER
Original Filed Aug. 17, 1928    5 Sheets-Sheet 5
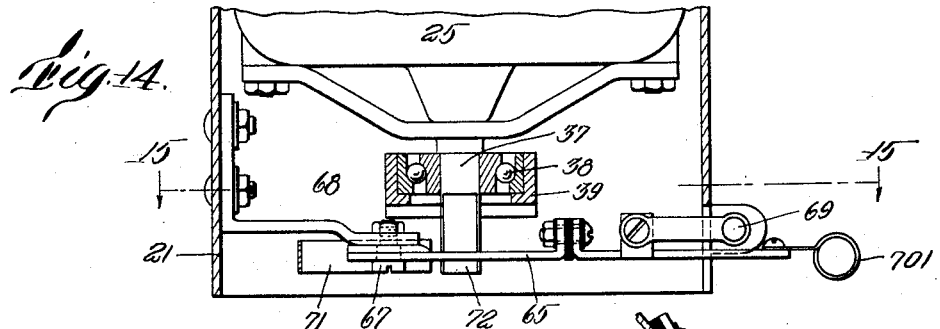
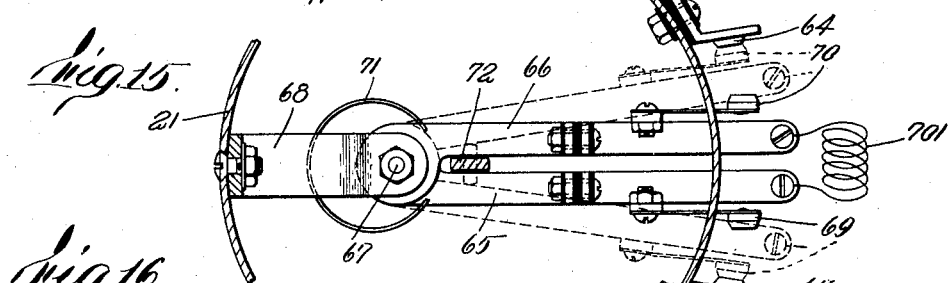
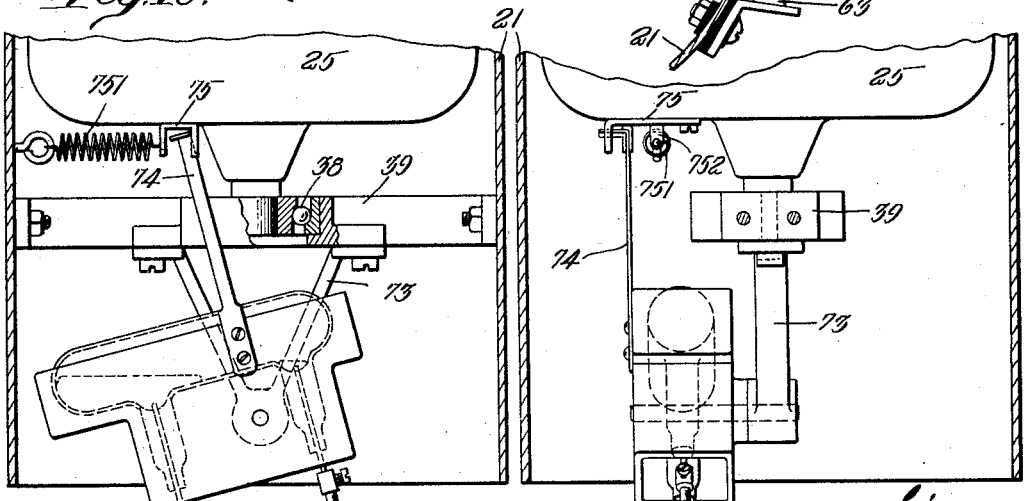
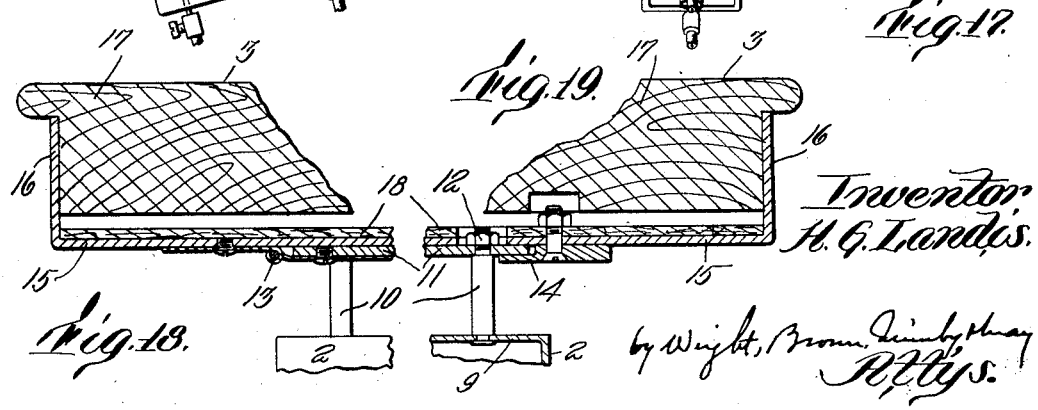
Inventor
H. G. Landis.
by Wright, Brown, Quinby & May
Attys.

Patented Mar. 28, 1933

1,903,219

UNITED STATES PATENT OFFICE

HUGH G. LANDIS, OF LOS ANGELES, CALIFORNIA

ELECTRIC HEATER

Application filed August 17, 1928, Serial No. 300,334. Renewed August 2, 1932.

The present invention relates to electric heaters of the type having a fan or blower for distributing the heated air, and an automatic circuit closer in the electric heating circuit controlled by the fan. Its object is to provide improvements in and relating to such heaters including means for humidifying the air, improved circuit closing means for the heating circuit controlled in a new way by the fan, a new and improved construction of the fan, a novel heating unit, and other new and useful features, the nature and utility of which appears from the following description.

The drawings herewith show in one of its possible embodiments, a heater containing the novel elements and characteristics of the present invention.

In these drawings,—

Fig. 1 is a top plan view partly broken away of the heater;

Fig. 2 is a side elevation partly broken away and shown in section;

Fig. 3 is a horizontal section on line 3—3 of Fig. 2;

Fig. 4 is a detail sectional view showing the construction of the electrical heating unit;

Fig. 5 is a detail cross section of one of the blades or arms of the fan, taken on line 5—5 of Fig. 3, showing the preferred construction thereof;

Fig. 6 is a diagram of the electrical parts of the heater;

Fig. 7 is an under plan view of the heater showing the circuit connections for the electric fan motor and heating unit, including means by which these electrical elements may be connected with sources of electrical current of different powers;

Fig. 8 is a side elevation of the thermostat controlling the motor circuit, showing adjacent parts of the frame structure in section;

Fig. 9 is a fragmentary elevation of the heater showing the adjuster for the thermostat;

Fig. 14 is a fragmentary vertical section showing a part of the fan motor and a circuit closer for the electrical heating unit alternative to that shown in Fig. 7;

Fig. 15 is a horizontal section of the alternative circuit closer taken on line 15—15 of Fig. 14;

Figs. 16 and 17 are elevations, seen in directions at right angles to one another, of another alternative means for controlling the heating unit switch by the fan motor;

Figs. 18 and 19 are fragmentary sectional views showing details of the top of the heater and the means for mounting the same.

Like reference characters designate the same parts wherever they occur in all the figures.

Figure 10:
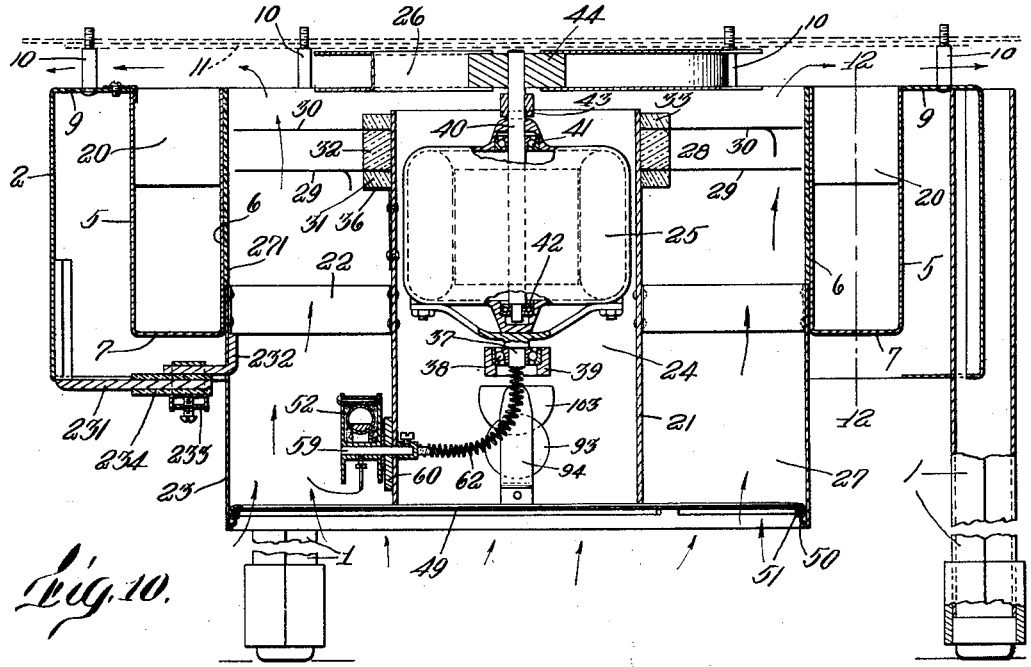
Fig. 10 is a vertical section of the heater.

The heater, in the illustration shown, is embodied in a low table, stand or stool having a flat top suitable as a depository for miscellaneous articles, as a seat, etc. Its structure includes legs 1, 1, preferably three in number, so that it will stand firmly on any uneven floor; outer walls 2, 2, preferably flat metal plates disposed and connected together to form a polygonal enclosure of ornamental appearance, supported by the legs; and a top 3, also preferably polygonal for ornamental appearance, projecting at its edges beyond the outer walls and separated from the upper edges of the latter by a space 4 which permits emission of heated air. Within the enclosure of the outer walls is an annular tank adapted to hold water, consisting of outer and inner cylindrical walls 5 and 6, connected by an annular bottom 7 and supported by a number of brackets 8 secured to the outer casing walls 2, as shown in Figs. 3 and 7. Said brackets comprise, each, an L-shaped bar having an upright leg secured to the outer wall 2, preferably to the flat portion of the structure, and a horizontal leg which extends under the bottom of the tank. There is preferably interposed between the legs and the clamp a pad of resilient non-conducting material, suitably a piece of rubber tubing surrounding the horizontal leg, for insulation and to prevent transmission of vibrations from one metal part to another. Preferably, also, the legs are equipped with rubber pads on their bottom ends. An annular plate 9 extends across the space between the walls 2 and 5, being supported thereby, and in which are mounted posts 10 at suitable intervals to support the top 3 at a suitable height to leave the emission opening 4.

The said posts are threaded at their upper ends and have shoulders adjacent to their threaded extremities. The shoulders support, and the threaded extremities pass through, a plate 11, which is secured in place by nuts 12, as shown in Fig. 19. The plate 11 is provided with an opening over any desired part of the water tank, to permit passing of water into the tank. The top 3 is connected to this plate by a hinge 13 (Fig. 18) so that it may be raised to give access to the above mentioned opening when replenishment of the tank is needed. Clips 14 pivoted at suitable points to the under side of the top (see Fig. 19) are adapted to be turned so as to underlap the plate 11, when the top is lowered, to secure the latter in horizontal position. The top may be made of a metal shell having a bottom 15 and sides 16, in which is fitted and secured a thick block or plate 17 of wood, asbestos, or other suitable material which has good heat insulating and electrical insulating properties. To increase the heat insulating properties of the top, a sheet of asbestos paper or the like 18 may be placed on the bottom 15 and separated from the block 17 by an air space. Thus, even though a high temperature may be developed within the heater, the upper surface of the top will remain relatively cool.

Figures 12, 13:
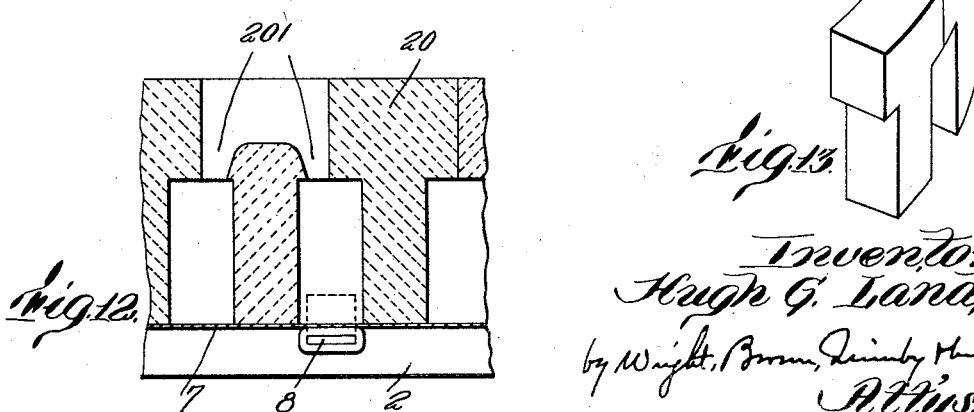
Fig. 12 is a fragmentary sectional view taken on line 12—12 of Fig. 10, illustrating a detail of the humidifying means.
Fig. 13 is a perspective view of a detail of the humidifier.

In the annular water tank are placed absorbent bodies 20 to serve as wicks for raising water to the level of the discharge slit. These absorbent bodies are preferably T-shaped blocks of very porous fire-brick material, the top surfaces of which are flush with the top edges of the tank walls, and the arms of which meet one another throughout the entire circuit of the tank, thus forming a continuous porous surface which constitutes part of the lower boundary of the emission slot, and over which the heated air is blown, while the stems or trunks of these blocks pass to the bottom of the tank and are separated from one another, leaving space for a greater quantity of water than could be obtained in the tank if the latter were fully occupied by the porous material. I may use other types of water lifter, including ordinary wicking, blocks or porous felt, or a mass of fiber, in short anything which has the property of raising water by capillary action. But the specific type of water lifter above described has advantages over others and is claimed as a feature of the invention. When the T-shaped blocks are used, the one of them which lies beneath the filling opening of plate 11 is partly cut away or grooved, as shown in Figs. 3 and 12, to provide open passages 201 for pouring in water.

In the center of the structure is a tube 21 supported by beams or brackets 22, which in turn are secured to a tubular shell 23 which is fitted in the lower end of the space surrounded by the water tank, and is supported by brackets 231; each of which comprises an L-shaped bar having an upright leg secured to the outer wall 2, preferably in an angle of the structure, and a horizontal leg; a second L-shaped bar 232 having an upright leg secured to shell 23, and having a horizontal leg superposed on the horizontal leg of the first named bar; and a clamp 233 embracing said superposed legs. There is preferably interposed between the two overlapping legs, and between one of said legs and the clamp, a pad 234 of resilient non-conducting material, suitably a piece of rubber tubing surrounding one of said legs, for insulation and damping of vibration. The space 24 within the tube 21 contains an electric motor 25 for driving a fan 26; while the annular space 27 around the tube 21 and within the shell 23 and the humidifying tank is the passage through which air flows to be heated. A liner sleeve 271 of heat-insulating material is preferably placed inside the inner wall of the tank.

An electrical heating unit 28 is mounted across the passage 27 near the upper end thereof. The unit consists of one, two or more high resistance conductors 29 and 30 which are bent in zigzag formation with the bends or loops all in a horizontal plane, as close together as feasible without causing a short circuit, and are laid in annular formation. The inner loops of the lower conductor 29 are clamped between rings 31 and 32 of porcelain or other suitable refractory non-conducting material; while the inner loops of the conductor 30 are clamped between the ring 32 and an upper ring 33. These rings have anchor bosses 34 on the surfaces adjacent to one another, which contact with each other and are embraced by the inner loops of the heating conductors to anchor the latter in place when the parts are suitably assembled. The anchor bosses also serve to space and locate said inner loops correctly and to provide spaces between the rings into and out of which the lengths of the resistance conductors may pass. The rings are secured together and the contiguous bosses held in alinement by screws or rivets, one of which is shown dotted at 35 in Fig. 4, passed at suitable intervals through all the rings.

The heating unit thus constituted surrounds the tube 21 and is supported at the upper end thereof by a ledge or brackets 36 (see Fig. 10). The loops of the heating conductors extend substantially all the way across the annular space 27, their outer bends being, however, out of contact with the humidifying tank. The motor 25 is mounted rotatably within the tube 21. That is, the casing and field coils, constituting what is normally the stator of a motor, are free to move rotatably to a limited extent for a purpose presently described. In conformity with common practice I will call these parts of the present motor the stator, even though they are thus movable. The stator is mounted with its axis upright in the center of the tube 21 and is provided with a pivot or trunnion 37, at its lower end, which is centered and supported by a ball bearing 38 in a cross bar 39, the ends of which are secured to opposite points in the walls of the tube. The rotor shaft 40 of the motor is mounted in ball bearings 41 and 42 in the stator, and is centered above the stator by a cross bar 43.

The fan 26 is secured to the rotor shaft 40. It embodies novel features which I claim as part of the invention. It consists of a hub 44 (see Fig. 3) which is small in comparison with the diameter of the tube 21, and four, more or less, arms 45. These arms are preferably radial, or approximately so, from the hub to the tube 21, and beyond the latter are curved backwardly from the direction in which the fan revolves, their curvature being preferably that of an involute to a base circle of approximately the same diameter as the tube 21. Their outer ends terminate approximately at the inner boundary of the humidifier, or within each boundary. Furthermore, the arms are of channel formation in cross section, as shown in Figs. 3, 5 and 10, consisting of a central web 46 and flanges 47 and 48. The arms are horizontal and rotate in a horizontal plane.

By virtue of the construction and arrangement of the parts just described, the fan is made exceedingly efficient in giving horizontal and radial movement to the air which passes through the heater. The lower flanges of the fan arms slice off, as it were, sections from the rising column of air, and the particles of air thus taken from the column are confined in the channels and guided to travel only in a horizontal plane, or substantially so. The radial portions of the fan arms give a tangential impulse to the air which passes through space 24, while the curved outer portions, traveling at a higher velocity, impose an outward thrust which, compounded with the inertia of the air, gives an almost purely radial resultant movement to the air. The outflowing air, in passing over the humidifier, takes up water vapor and carries into the atmosphere of the room a beneficial degree of humidity. In order to obtain a more pronounced effect in the absorption of water by the air, the outflowing air stratum may be deflected somewhat downwardly upon the surface of the water lifters 20, by making the cover plate 11 of concave or dished formation, or providing other suitable deflecting means above the fan having a downward inclination outwardly.

It will have been apparent from the foregoing description that the flow of air is induced by the fan through both spaces 24 and 27. That passing through the channel 27 is heated and discharged in all directions to heat the air of the room, while that passing through the channel 24 prevents overheating of the motor and is likewise heated, both by the heat of the motor and by mixing with the air passage through channel 27. A screen or dust strainer 49 is placed across the lower end of the spaces 24 and 27. Such screen may be made in a variety of constructions. For instance, it may be a sheet of open mesh textile fabric secured in an annular frame 50 by a clamp ring 51 of spring wire, the frame 50 being passed into the lower end of shell 23 and held there removably by friction or otherwise. I may use metal wire or fibrous yarns for the strands of the screen, or I may make a strainer out of alternate plain and corrugated metal ribbons rolled into a flat spiral and thrust into the lower end of shell 23.

That phase of my invention which resides in automatic control of the heating unit circuit is shown here in three different embodiments, each of which involves a circuit closer which is moved to close the circuit by rotation of the stator of the motor when set in action. In the form shown in Figs. 10 and 11, the circuit closer is a mercury switch of known character consisting of a glass tube 52 containing a body of mercury 53 and having cups or depressions 54 and 55 in its bottom into which extend the terminals of metal conductors 56 and 57, which are connected in the circuit of the heating unit. This switch is secured in a holder 58 of metal, hard rubber composition, bakelite, or other suitable material, and is supported therein by soft packing to avoid danger of breaking. The holder in turn is secured to a shaft 59 mounted in a bearing 60 which is fastened to the tube 21. A flexible shaft 62, preferably made as a helical wire spring, is connected at one end to the shaft 59 and at the other end to the trunnion 37 of the rotor stator. Having regard to the direction of rotation of the fan, the switch is so mounted and connected with the flexible shaft that, when the stator is turned oppositely to the fan by the reaction of the driving torque, the switch is moved from the inclined position shown by dotted lines in Fig. 11, to the horizontal position shown by full lines in said figure, thus completing the circuit of the heating unit. When the motor stops, the switch is returned to the inclined position, breaking the circuit, by gravity due to its excess weight at one side of its pivot, by the spring of the shaft 62, by a separate spring, or by the conjunction of these factors.

In the arrangement shown in Figs. 14 and 15, the switch consists of two separated contacts 63 and 64 mounted on the exterior of tube 21, and two arms 65 and 66 connected by a pivot 67 to a cross bar 68 in the tube 21 beneath the motor, and carrying complemental contacts 69 and 70. Those parts of the arms 65 and 66 on which the said complemental contacts are mounted are made of separate pieces insulated from the supported ends of the arms and electrically connected to one another by a conductor 701. The arms 65 and 66 are embraced and pressed upon externally by a bow spring 71 which embraces the pivot and presses the arms against the opposite sides of a flat cam 72 which projects between them from the rotor trunnion 37. Thus the springs are normally held in, and under constant tendency to return to, the open circuit position. When the stator is turned by the torque of the motor the cam 72 spreads the arms into the circuit closing position shown by dotted lines in Fig. 15.

Figure 11:
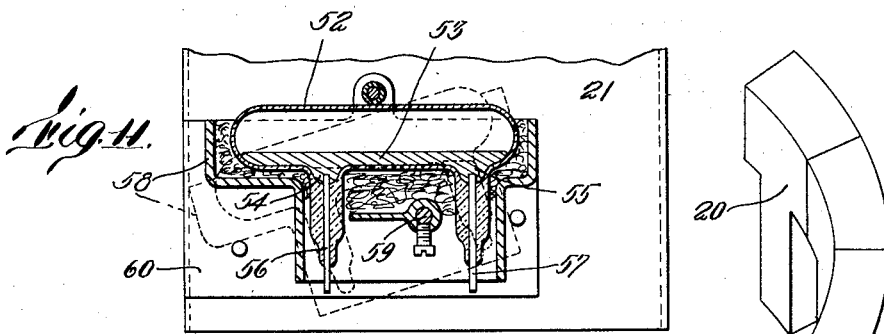
Fig. 11 is a detail view showing one form of circuit closer for the electrical heating unit.

In the form shown in Figs. 16 and 17, a mercury switch essentially similar to that shown in Fig. 11 is pivoted to a cross bar 73 below and at one side of the motor, and to the side of the switch casing is secured an arm 74 which rises toward the motor and is embraced by the two wings of a lug 75 secured to the motor casing. The lug is so disposed that it engages the arm and tilts the switch into horizontal circuit closing position when the casing is turned by the torque of the motor, and returns the switch to inclined position when the motor is stopped. A suitable spring 751 for so returning the switch is here shown as being connected to lug 752 and to an anchor abutment in the tube 21. It may be otherwise arranged, however.

The mercury switch may be modified in structure, if desired, as by making the tube containing the mercury and the holder of a single unitary construction of bakelite or other non-conductor which is less brittle than glass.

Another part of the invention consists in provisions for connecting the apparatus with sources of electricity supplying current under different voltages or in different quantities. For example, the same heater may be coupled to the ordinary house lighting circuit at 110 volts and 10 amperes, or thereabouts, or to a power circuit providing current for heating or power purposes at a higher voltage, and in greater quantity, say at 220 volts and 15 or 20 amperes. In the case here illustrated, the heater is equipped with two plugs 76 and 77 of conventional or any other suitable character, of which the former is intended for connection with the less powerful current supply, and the latter for connection with the more powerful current supply. The terminals 78 and 79 of the plug 76 are connected by conductors 80 and 81, in one of which may be interposed a thermostatic switch, later described, with the poles of the motor. A third conductor 811 leads to any desired point 82 in the heating unit, from another point 83 of which a conductor 84 leads to one of the terminals of the switch 52; from which the circuit to the terminal 79 is completed by conductors 85 and 86. Preferably the current from the low power inlet plug is conducted through a part only of the heating unit, in order that the part through which it flows will be heated to a higher temperature than would be obtained if it were passed through the entire unit.

When the high power inlet plug is used, the current to the motor is passed through a resistance 88 in order to avoid injury to the motor. This resistance is in circuit with the terminal 89 of the plug 77 through a conductor 90, and with the motor through a conductor 91 connected to conductor 80. A conductor 92 leads from terminal 89 to one terminal of the heating unit, the other end of which is connected at 83 to the conductor 84, whence the rest of the heating circuit is as previously described. In this case all of the heating capacity of the unit is utilized, whereby a greater heating effect is obtained. But either of the conductors 811, 84 and 92 may be cut in at any other points of the unit as may be desired to control the temperature and amount of heat generated.

Preferably a thermostatic switch 93 is placed in the circuit of the motor to control the heater automatically according to the room temperature, whether the heater is supplied with current from one source or the other; being interposed in this circuit rather than that of the heating unit because the motor takes less current and its circuit may be more easily made and broken and with much less arcing. The thermostat which I prefer to use for this purpose is one in which the circuit is made and broken by a mercury switch embodying new principles of construction and arrangement whereby great sensitiveness is achieved, notwithstanding the variable resistance to the necessary movements of the switch, caused by a movable body of mercury.

In the form here shown, the thermostat comprises a frame 94 which may be secured to any suitable part of the frame structure, for instance, on the wall of the tube 21 inside of the same, or on any other wall where room for placing it is found. The thermostat has an outer shell 95 of bellows constrution, or permissibly of connected diaphragm construction. One end of the shell is closed and is secured to the bracket. The other end is open but is covered by a deeply offset head 96 with which it is in leakage tight contact. The head 96 is of cup formation and occupies a large proportion of the internal volume of the shell 95. It provides a large space which is external to the thermostat shell and yet within the physical boundaries of the shell, wherein is contained part of the mercury switch 97. This switch is a tube connected by a pivot 98 with a frame 99, which is secured to the end of the thermostat and through which the tube extends. Two separated terminals 100 are located in the outer or protruding end of the tube and are adapted to be connected by the mercury when that end is tilted downward. These terminals are separately connected with separated parts of the motor circuit.

On the same end of the switch tube is a bar or lug 101 and a depending arm carrying a counter weight 102. Beside the lug 101 is an abutment 103 secured to a rod 104 which is screwed into the upright at the rear of the bracket 94 and has an external knob 105 for manipulative adjustment.

It will be apparent that as the thermostat is expanded by heat, the switch is bodily moved forward and its lug 101, being arrested by the abutment 103, is raised until the mercury in the switch tube flows away from the terminals 100 and breaks the circuit. This puts the whole heater out of action because the consequent stopping of the motor also causes the switch of the heating unit to be opened.

The counter weight 102 slightly overbalances the opposite end of the switch tube even when the mercury is in that end, wherefore as soon as the thermostat contracts upon cooling, the switch tube is tilted and the motor circuit again closed. Shifting of the abutment 103 by rotating the rod on which it is held alters the temperature at which the switch will be opened and closed. The abutment may be made as a dial carrying numbers which indicate the approximate temperatures of making and breaking the circuit, which are visible through a window 107 in an adjacent wall of the structure; or, in case the abutment is located in the innermost part of the heater structure, an equivalent dial may be mounted on the extended rod adjacent to the outer wall of the structure in cooperation with a window in, or an index on, such outer wall.

That feature of the thermostat which consists in offsetting the end wall within the shell and locating the switch in the space so provided, is not original with me, but is the invention of William K. Simpson, of Waterbury, Connecticut. The other novel characteristics above described are my invention and are herein claimed as such.

An especially efficient heating effect is secured by means of this heater. The construction of the fan and its position directly above the heating unit causes the air to be discharged at high velocity in a horizontal layer with a minimum of disturbance through airflow in other than radial directions from the heater. The heat generated thus penetrates rapidly to the outermost parts of the room in which the heater is installed. And, as the air to be heated flows to the lower part of the heater in all directions from points below the level at which the heated air is discharged, much of the heated air is deflected by the circulation toward the floor instead of rising more or less directly to the ceiling; whereby the new result is obtained that the air adjacent to the floor is actually heated faster and to a higher temperature than that next to the ceiling of the room. Indeed the rise of the floor temperature is parallel to, and nearly as great as that of the breathing line temperature. By "breathing line" I mean a level above the floor approximating the average between the height of a normal adult person's head when seated and the height when standing. In accomplishing this result I have approached closely to the ultimate ideal of artificial heating, to produce the highest temperature at the floor and the lowest at the ceiling, with a substantially uniform gradient between.

The humidifying element is a highly desirable and valuable feature, inasmuch as it mitigates the excessive dryness of artificially heated air, which is a known cause of various ills of the respiratory passages and of the need for an excessive amount of heat to produce a sensation of comfortable warmth in cold weather. In its construction as here disclosed, it is exceedingly compact while yet presenting a relatively large area of exposed evaporating surface and large storage capacity for water.

The heating unit circuit may be disconnected from the source of current supply and the fan used alone, with or without humidification of the air, in order to circulate the air in a room otherwise heated, or to obtain the cooling effect of air circulation in hot weather. The new mode of automatically controlling the heating circuit herein disclosed has the conspicuous advantage that it enables existing types of mercury switch to be used and also enables commercial motors to be used, requiring no modification of the latter other than the attachment to the motor casing of the fitting which carries the lower pivot. As plainly shown in the drawings, this fitting is a separate dished plate or spider adapted to be attached by screws to the motor casing and having the pivot affixed at its lowest and central point. I prefer to use induction motors, but am not restricted to this type and may use any of the types of motor which are built in small powers suitable for the work required.

It is to be understood that the terms "horizontal" and "vertical" used in this specification and in the following claims have reference to the relationship of the parts of the heater when placed in its normal upright operative position.

What I claim and desire to secure by Letters Patent is:

1. An electric heater comprising a central air passage, a fan mounted to rotate horizontally above said passage and constructed to discharge air laterally, horizontal guiding means for discharging air, and a humidifier surrounding said passage and having an exposed evaporating surface forming part of said guiding means and being in contact with the air discharged by the fan.

2. The combination of a casing having an axially arranged air inlet and a lateral surrounding outlet, a fan arranged to discharge air radially from all parts of said outlet, a water container and capillary means leading from said container and arranged to provide an annular exposed evaporating surface in contact with to the air stream delivered by said fan.

3. The combination of a casing having an axially arranged air inlet and a lateral surrounding outlet, a fan arranged to discharge air radially from all parts of said outlet, an annular tank surrounding the air inlet, and capillary means in said tank arranged to form an extended annular evaporating surface constituting one boundary of the space through which air is discharged from the casing.

4. An electric heater comprising a casing having coaxial air passages and an encircling lateral outlet at one end of said passages, an electric motor located in the inner passage, electric heating means located in and extending across the outer passage, and a fan connected to the shaft of said motor having air displacing arms arranged to rotate across the end of said passages in the same plane with said outlet and constructed to induce flow of air past both the motor and the heating means.

5. An electric heater having a central passageway, a motor contained therein, an annular passageway surrounding the central passageway, a heating unit contained in planes crossing the annular passageway, and a fan connected to the shaft of the motor to rotate above and draw air through both passageways, the fan being constructed to discharge air horizontally.

6. An electric heater comprising a casing having an internal vertical cylindrical passageway, an electric heating unit arranged in said passageway, a fan arranged coaxially with said passageway having arms extending across one end thereof, rotatable in a horizontal plane and constructed to discharge the air substantially entirely in the same plane, and a lateral encircling outlet in the same plane with said arms.

7. In a heater of the character described, a casing having a vertical cylindrical passageway and a lateral encircling delivery outlet, heating means in said passageway, and a fan rotatably mounted coaxially with said passageway having arms which extend horizontally substantially entirely across the passageway and are constructed to prevent axial flow but compel radial flow of the air leaving them, and means for rotating said fan.

8. An electric heater comprising a casing having a vertical inlet passageway and an encircling outlet slot at the upper end of said passageway, electric heating means in said passageway, and a fan mounted coaxially with said pasageway to rotate horizontally in the same plane with said outlet, having rotating arms of channel cross section open at the forward side.

9. In an air circulating apparatus of the character set forth, a casing having an upright interior passage and an encircling lateral outlet at the upper end of said passage, a fan mounted to rotate horizontally in the same plane with said outlet and having arms extending substantially entirely across the passage, said arms having forwardly projecting flanges adjacent to the upper and lower limits of the outlet for entrapping and imparting horizontal movement to the air issuing from the passage.

10. An electric heater comprising a casing having an interior air passage and a lateral outlet, an electric heating unit in said passage, an electric fan for propelling air past said unit and out of said outlet, an electric motor having a shaft on which said fan is mounted and an independently rotatable stator, a normally open switch in the circuit of said heating unit, and connections through which the stator, when moved by the reaction of its driving torque, shifts said switch into circuit closing position.

11. In an electric heater, the combination of a heating unit, a tiltable mercury switch in the circuit of said unit, an electric fan for inducing air flow past said unit and out of the heater, an electric motor having a rotor to which said fan is connected, and an independently rotatable stator, and an operating connection between said stator and switch for moving the switch when the stator is moved.

12. In an electric heater, the combination of a heating unit, a tiltable mercury switch in the circuit of said unit, an electric fan for inducing air flow past said unit and out of the heater, an electric motor having a rotor to which said fan is connected, an independently rotatable stator, an operating connection between said stator and switch for moving the switch when the stator is moved, and yieldable means normally holding the switch and the stator in, and tending to return them to, the position which they occupy when the heating unit circuit is open.

13. In an electric heater, the combination with a fan, of an electric motor having a rotor to which said fan is connected, a support on which the stator of the motor is mounted with ability for rotation, an electric heating unit, a tiltable electric switch in the circuit of said unit adapted to open and close the circuit of the unit when turned in one direction or the other about a horizontal axis, and rotation transmitting means between the motor stator and the switch.

14. In an electric heater, the combination with a fan, of an electric motor having a rotor to which said fan is connected, a support on which the stator of the motor is mounted with ability for rotation, a cam connected to said stator and rotatable therewith, an electric heating unit, a switch having pivotally mounted arms embracing said cam and spring pressed against the same, so as to be spread apart when the cam is turned with rotation of the motor stator, and separated contact members in the circuit of the heating unit arranged to be engaged by complemental contact members carried by said arms and in electrical conducting connection with each other.

15. In an electric heater, an annular passageway for air to be heated, having inner and outer walls, rings of refractory insulating material surrounding said inner wall and superposed upon one another having separated anchor bosses, and a heating unit consisting of a high resistance conductor bent in a zigzag manner and arranged in an annular formation, with its inner bends entering between said rings and embracing said anchor bosses.

16. In an electric heater, a plurality of coaxial walls forming between them an annular air passage, superposed rings of refractory insulating material surrounding the inner one of said walls, all of said rings having on their faces contiguous to one another, anchor bosses with intermediate spaces and being secured together with said bosses in contact with one another, and electrical conductors of high resistance located in said annular passage, each having loops extending into the spaces between two contiguous rings and embracing the anchor bosses thereof.

17. An electric heater comprising a casing having an air passage, an electric heating unit arranged to deliver heat to air passing through said passage, a fan for causing flow of air through the passage, an electric motor for driving said fan, a switch in the circuit of the heating unit operable by the motor to close said circuit when the motor is running, and open the circuit when the motor is idle, and a thermostatic switch in the motor circuit having a controlling thermostat exposed to the air being circulated by said fan.

18. In an electric heater, a humidifier comprising an annular tank with porous capillary bodies extending from the bottom to the upper open part thereof and having collectively an extended substantially horizontal evaporating surface, means for blowing air across such surface.

19. In an electric heater, a humidifier comprising an annular tank, and T-shaped porous capillary bodies arranged with their stems or trunks extending substantially to the bottom of the tank and their arms extending laterally close to one another.

20. In an electric heater, a himidifier comprising an annular tank, and T-shaped porous capillary bodies arranged with their stems or trunks extending substantially to the bottom of the tank and their arms extending laterally close to one another, the top sides of the T-shaped blocks forming a substantially continuous annular surface which is approximately coextensive with the annular area of the tank.

21. An electric heater comprising a base structure having an interior passage for air, and an annular tank surrounding said passage adapted to contain water, posts rising from said base structure, a plate mounted on said posts in a horizontal position and vertically separated from said structure, and a top member of heat insulating construction secured to said plate with provision for being raised for giving access to the plate and to parts beneath the same.

22. An electric heater comprising in combination a casing structure having a passageway for air, an electric heating unit in said passageway, a fan arranged to cause flow of air through said passage and past said unit, an electric motor for driving the fan, and a thermostatic switch in the circuit of said motor, said switch comprising an expansible shell containing volatile fluid, a pivoted tube containing separated electrical contact members and a movable conducting body adapted to be brought into conducting contact with said contact members when the tube is tilted in one direction and out of contact therewith when tilted in the opposite direction, and an abutment arranged to engage a portion of said switch and to tilt it in one direction when the thermostat shell is being distorted by a change in the pressure of its contained working fluid, the switch being constantly under yielding force tending to tilt it oppositely to the movement so given by said abutment.

23. An electric heater comprising a casing having an interior air passage and a lateral outlet, an electric heating unit in said passage, an electric fan for propelling air past said unit and out of said outlet and separate electrical connections for admission of electric current to said unit and the motor of said fan, one of said connections including the entire unit and the other including a part only of the unit, the fan motor being in connection with both.

In testimony whereof I have affixed my signature.

HUGH G. LANDIS.